United States Patent
Hwang et al.

(10) Patent No.: US 12,282,103 B2
(45) Date of Patent: Apr. 22, 2025

(54) METHOD AND DEVICE FOR POSITION COMPENSATION BY FIRST DEVICE IN WIRELESS COMMUNICATION SYSTEM SUPPORTING SIDELINK

(71) Applicant: LG ELECTRONICS INC., Seoul (KR)

(72) Inventors: Jaeho Hwang, Seoul (KR); Hakseong Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 364 days.

(21) Appl. No.: 17/919,619

(22) PCT Filed: Apr. 26, 2021

(86) PCT No.: PCT/KR2021/005226
§ 371 (c)(1),
(2) Date: Oct. 18, 2022

(87) PCT Pub. No.: WO2021/221404
PCT Pub. Date: Nov. 4, 2021

(65) Prior Publication Data
US 2023/0168386 A1 Jun. 1, 2023

(30) Foreign Application Priority Data
Apr. 28, 2020 (KR) .......................... 10-2020-0051700

(51) Int. Cl.
*G01S 19/25* (2010.01)
*G01S 19/30* (2010.01)

(52) U.S. Cl.
CPC .............. *G01S 19/25* (2013.01); *G01S 19/30* (2013.01)

(58) Field of Classification Search
CPC ......... H04W 64/00; H04W 4/40; H04W 4/46; G01S 2013/468; G01S 13/878; G01S 15/42; G01S 19/25; G01S 19/30
See application file for complete search history.

(56) References Cited

U.S. PATENT DOCUMENTS

2016/0061614 A1\* 3/2016 Lee .......................... G01C 21/28
701/446
2017/0150330 A1\* 5/2017 Kim ....................... H04W 76/10
(Continued)

FOREIGN PATENT DOCUMENTS

| CN | 103630918 A | \* | 3/2014 | ............. G01S 19/40 |
| JP | 2013101013 A | \* | 5/2013 | |

(Continued)

*Primary Examiner* — Dung Hong
(74) *Attorney, Agent, or Firm* — BRYAN CAVE LEIGHTON PAISNER LLP

(57) ABSTRACT

Disclosed are the method and the device for same, the method comprising the steps of: receiving a first signal including information on a position of a second device on a first coordinate axis and a second coordinate axis through the first antenna and the second antenna; and compensating a position of the first device on the basis of the first signal, wherein the first device determines a specific time at which the position of the first device corresponds to the position of the second device, on the basis of a difference in reception times of the first signal between the first antenna and the second antenna, and compensates the position of the first device at the specific time on one coordinate axis specified by the first signal among the first coordinate axis and the second coordinate axis.

14 Claims, 22 Drawing Sheets

Receiving a first signal using distributed antennas — S201

Determining a specific time based on the reception time difference — S203

Correcting the location of the first device corresponding to the specific time — S205

(56) References Cited

U.S. PATENT DOCUMENTS

2019/0208387 A1* 7/2019 Jiang .................. H04W 4/46
2021/0341629 A1* 11/2021 Kishimoto ............ G01S 19/071

FOREIGN PATENT DOCUMENTS

| KR | 1020160140756 A | 12/2016 | | |
|---|---|---|---|---|
| KR | 1020190116453 A | 10/2019 | | |
| KR | 1020190129394 A | 11/2019 | | |
| KR | 1020200015506 A | 2/2020 | | |
| WO | WO-2015160158 A1 * | 10/2015 | .......... | G01S 5/0289 |
| WO | 2020030688 A1 | 2/2020 | | |

\* cited by examiner (a)

(b)

METHOD AND DEVICE FOR POSITION COMPENSATION BY FIRST DEVICE IN WIRELESS COMMUNICATION SYSTEM SUPPORTING SIDELINK

This application is the National Stage filing under 35 U.S.C. 371 of International Application No. PCT/KR2021/005226 filed on Apr. 26, 2021, which claims priority to Korean Patent Application No. 10-2020-0051700 filed on Apr. 28, 2020, the contents of which are all hereby incorporated by reference herein in their entirety.

TECHNICAL FIELD

The present disclosure relates to a method of correcting, by a first device, a position based on a first antenna and a second antenna distributed at a predetermined distance in a wireless communication system supporting sidelink and apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

DISCLOSURE

Technical Problem

The object of the present disclosure is to provide a method of enabling a first device to accurately specify a time point at which the position of the first device corresponds to a position included in a first signal based on a difference in times at which the first signal is received by distributed antennas and correct the position of the first device at the specified time point fairly accurately based on the position included in the first signal.

It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following detailed description.

Technical Solution

In an aspect of the present disclosure, there is provided a method of correcting, by a first device, a position based on a first antenna and a second antenna distributed at a predetermined distance in a wireless communication system supporting sidelink. The method may include: receiving a first signal on the first antenna and the second antenna, wherein the first signal may include information on a position of a second device on a first coordinate axis and a second coordinate axis; and correcting a position of the first device based on the first signal. The first device may be configured to: determine a specific time at which the position of the first device corresponds to the position of the second device, based on a difference in reception times at which the first signal is received by the first antenna and the second antenna; and correct the position of the first device at the specific time on one coordinate axis specified by the first signal among the first coordinate axis and the second coordinate axis.

Alternatively, the first signal may further include information on a first variance related to the first coordinate axis and a second variance related to the second coordinate axis.

Alternatively, a coordinate axis related to a variance within a predetermined threshold range among the first variance and the second variance may be specified as the one coordinate axis.

Alternatively, the first device may be configured to determine as the one coordinate axis a coordinate axis related to a variance with a value of 0 among the first variance and the second variance.

Alternatively, the first device may be configured to determine as the specific time a time of receiving the first signal at which the difference in reception times is calculated as 0.

Alternatively, the first device may be configured to: periodically calculate the difference in reception times based on the received first signal; and determine the specific time based on a change in a sign of the calculated difference in reception times.

Alternatively, the first device may be configured to determine the specific time based on a ratio between a first difference in reception times before the sign changes and a second difference in reception times after the sign changes.

Alternatively, the first device may be configured to correct a coordinate of the first device on the one coordinate axis to a value obtained by adding a predetermined offset to a coordinate of the second device on the one coordinate axis.

Alternatively, the predetermined offset may be preconfigured based on a positional relationship between an intermediate point between the first antenna and the second antenna in the first device and a reference point serving as a reference for the position of the first device.

Alternatively, the first coordinate axis and the second coordinate axis may be a latitude axis and a longitude axis, respectively.

In another aspect of the present disclosure, there is provided a method of transmitting, by a second device, a first signal in a wireless communication system supporting sidelink. The method may include: generating the first signal including information on a position of the second device on a first coordinate axis and a second coordinate axis; and transmitting the first signal periodically. The first signal may further include information specifying one coordinate axis that needs to be corrected by surrounding devices among the first coordinate axis and the second coordinate axis.

In another aspect of the present disclosure, there is provided a first device configured to correct a position in a wireless communication system supporting sidelink. The first device may include: a first antenna; a second antenna, wherein the first antenna and the second antenna may be distributed at a predetermined distance; and a processor connected to the first antenna and the second antenna. The processor may be configured to: control the first antenna and the second antenna to receive a first signal including information on a position of a second device on a first coordinate axis and a second coordinate axis; determine a specific time at which a position of the first device corresponds to the position of the second device, based on a difference in reception times at which the first signal is received by the first antenna and the second antenna; and correct the position of the first device at the specific time on one coordinate axis specified by the first signal among the first coordinate axis and the second coordinate axis.

In another aspect of the present disclosure, there is provided a second device configured to transmit a first signal in a wireless communication system supporting sidelink. The second device may include: a radio frequency (RF) transceiver; and a processor connected to the RF transceiver. The processor may be configured to: generate the first signal including information on a position of the second device on a first coordinate axis and a second coordinate axis; and control the RF transceiver to transmit the first signal periodically. The first signal may further include/information specifying one coordinate axis that needs to be corrected by surrounding devices among the first coordinate axis and the second coordinate axis.

In another aspect of the present disclosure, there is provided a chipset configured to correct a position of a first device having a first antenna and a second antenna distributed at a predetermined distance in a wireless communication system supporting sidelink. The chipset may include: at least one processor; and at least one memory operably connected to the at least one processor and configured to, when executed, cause the at least one processor to perform operations. The operations may include: receiving a first signal on the first antenna and the second antenna, wherein the first signal may include information on a position of a second device on a first coordinate axis and a second coordinate axis; determining a specific time at which the position of the first device corresponds to the position of the second device, based on a difference in reception times at which the first signal is received by the first antenna and the second antenna; and correcting the position of the first device at the specific time on one coordinate axis specified by the first signal among the first coordinate axis and the second coordinate axis.

Alternatively, the processor may be configured to generate a control signal related to autonomous driving of the first device electrically connected to the chipset based on the specific time.

In another aspect of the present disclosure, there is provided a computer-readable storage medium including at least one computer program configured to correct a position of a first device having a first antenna and a second antenna distributed at a predetermined distance in a wireless communication system supporting sidelink. The computer-readable storage medium may include: the at least one computer program configured to cause at least one processor to perform operations for correcting the position of the first device; and the computer-readable storage medium having stored thereon the at least one computer program. The operations may include: receiving a first signal on the first antenna and the second antenna, wherein the first signal may include information on a position of a second device on a first coordinate axis and a second coordinate axis; determining a specific time at which the position of the first device corresponds to the position of the second device, based on a difference in reception times at which the first signal is received by the first antenna and the second antenna; and correcting the position of the first device at the specific time on one coordinate axis specified by the first signal among the first coordinate axis and the second coordinate axis.

In a further aspect of the present disclosure, there is provided a method of correcting a position by a first device in a wireless communication system supporting sidelink. The method may include: receiving a first signal including information on a position of a second device from the second device; receiving a second signal from the second device; and correcting the position of the first device based on the first signal and the second signal. The first device may be configured to: determine a specific time at which the position of the first device corresponds to the position of the second device, based on a Doppler effect of the second signal; and correct the position of the first device at the specific time on one coordinate axis specified by the first signal among the first coordinate axis and the second coordinate axis.

Alternatively, the second signal may be a signal for at least one of an ultrasonic wave, a sound wave, an infrared ray, or an ultraviolet ray, and a time at which the second signal is received at a center frequency corresponding to a center frequency of the second signal may be determined as the specific time.

Advantageous Effects

According to various embodiments of the present disclosure, a first device may accurately specify a time point at which the position of the first device corresponds to a position included in a first signal based on a difference in times at which the first signal is received by distributed antennas and correct the position of the first device at the specified time point fairly accurately based on the position included in the first signal.

Effects to be achieved by embodiment(s) are not limited to what has been particularly described hereinabove and other effects not mentioned herein will be more clearly understood by persons skilled in the art to which embodiment(s) pertain from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE

Figure 1:
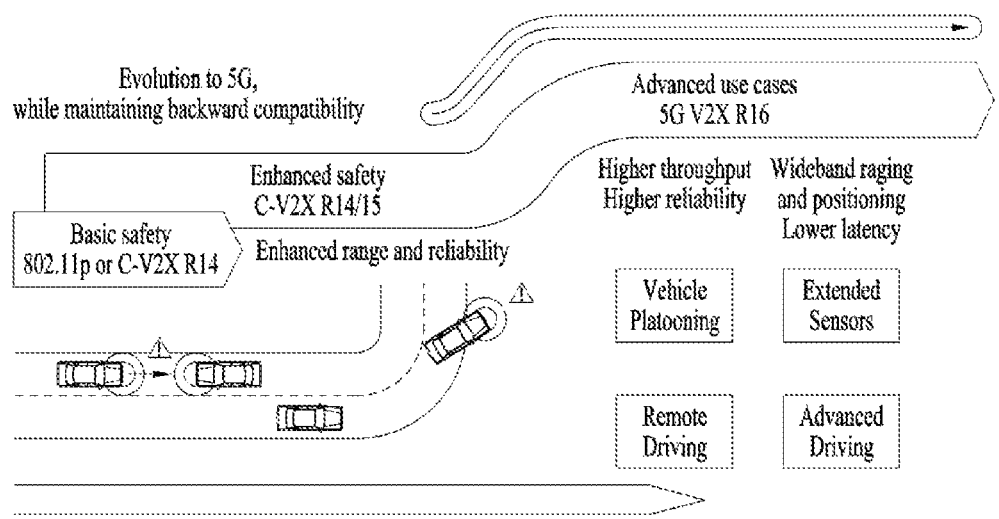
FIG. 1 is a diagram for explaining by comparing V2X communication based on RAT before NR and V2X communication based on NR.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
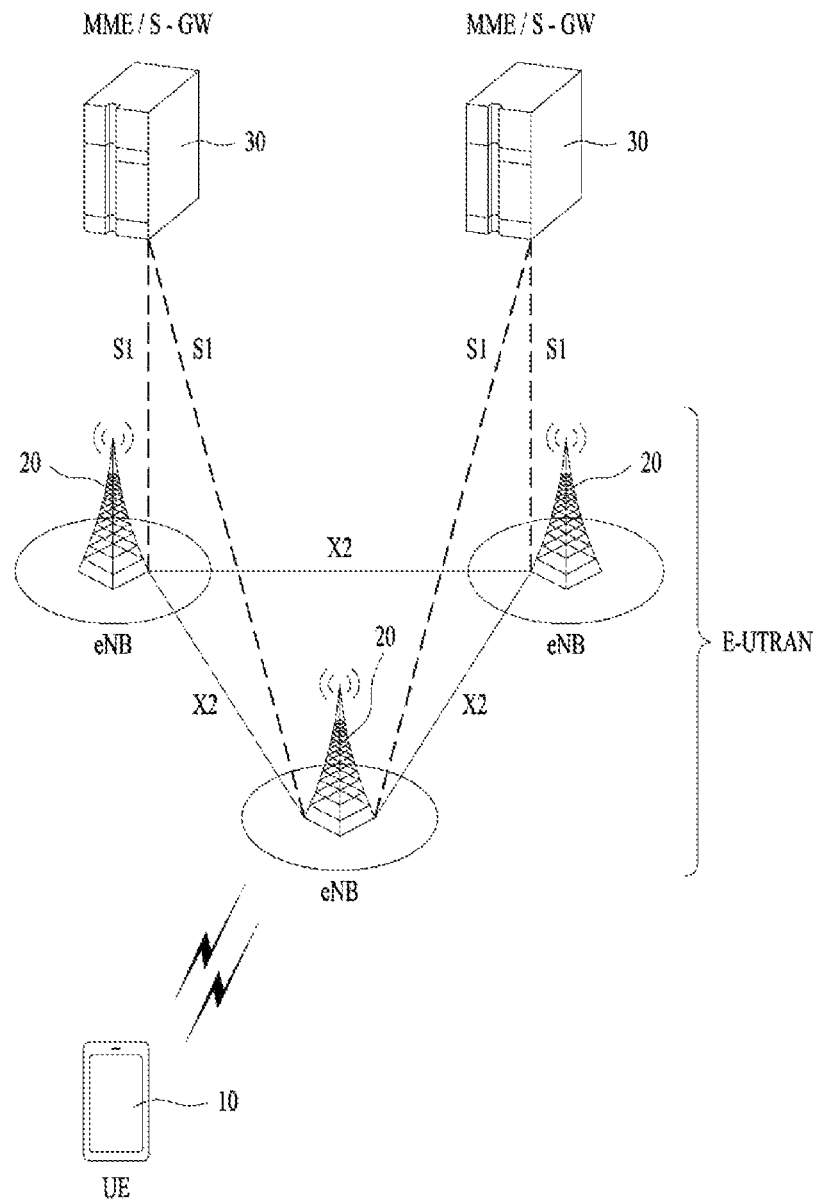
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
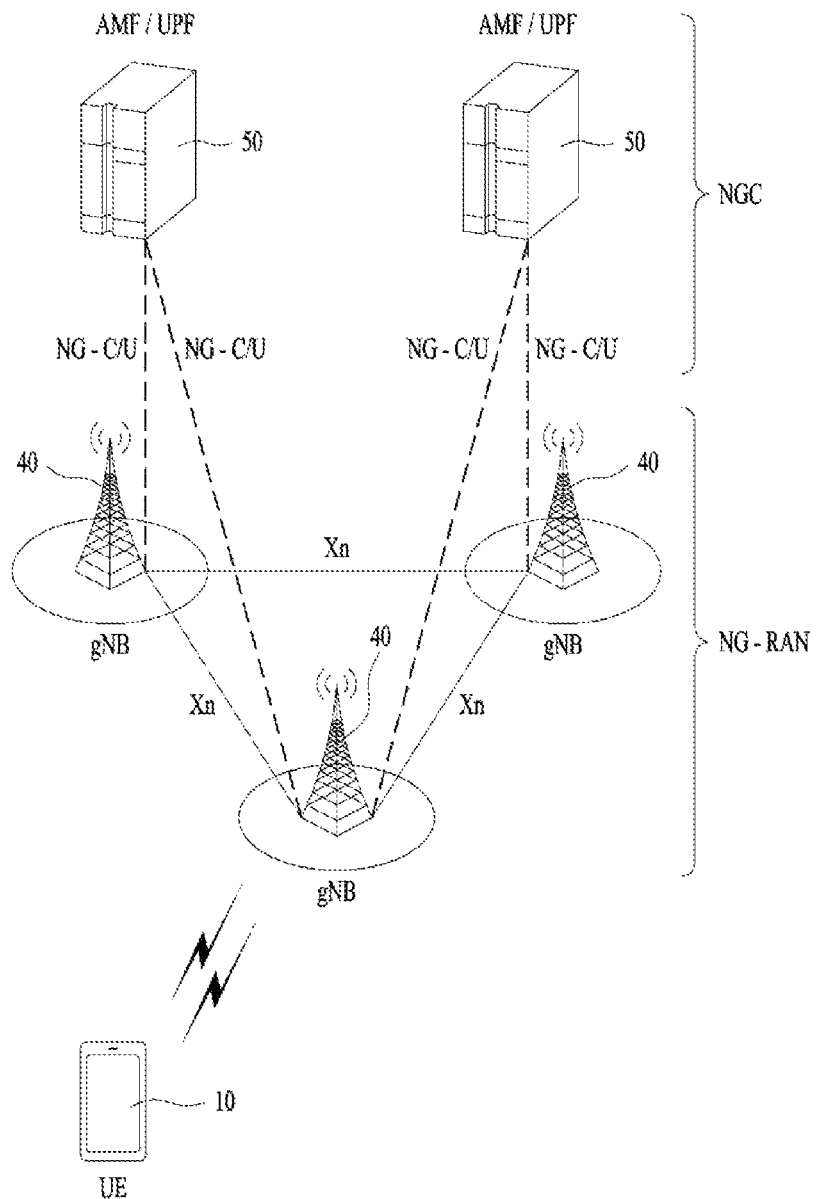
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
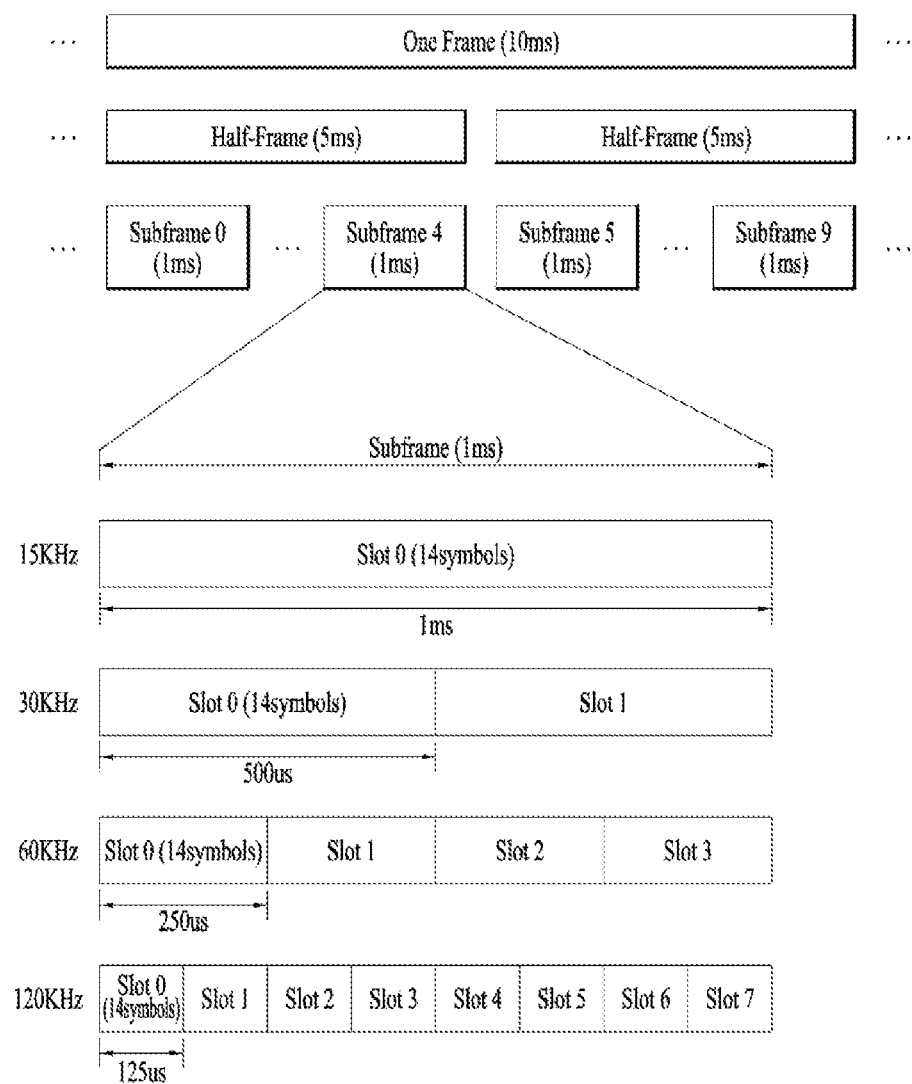
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration µ in the NCP case.

TABLE 1

| SCS (15*2u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
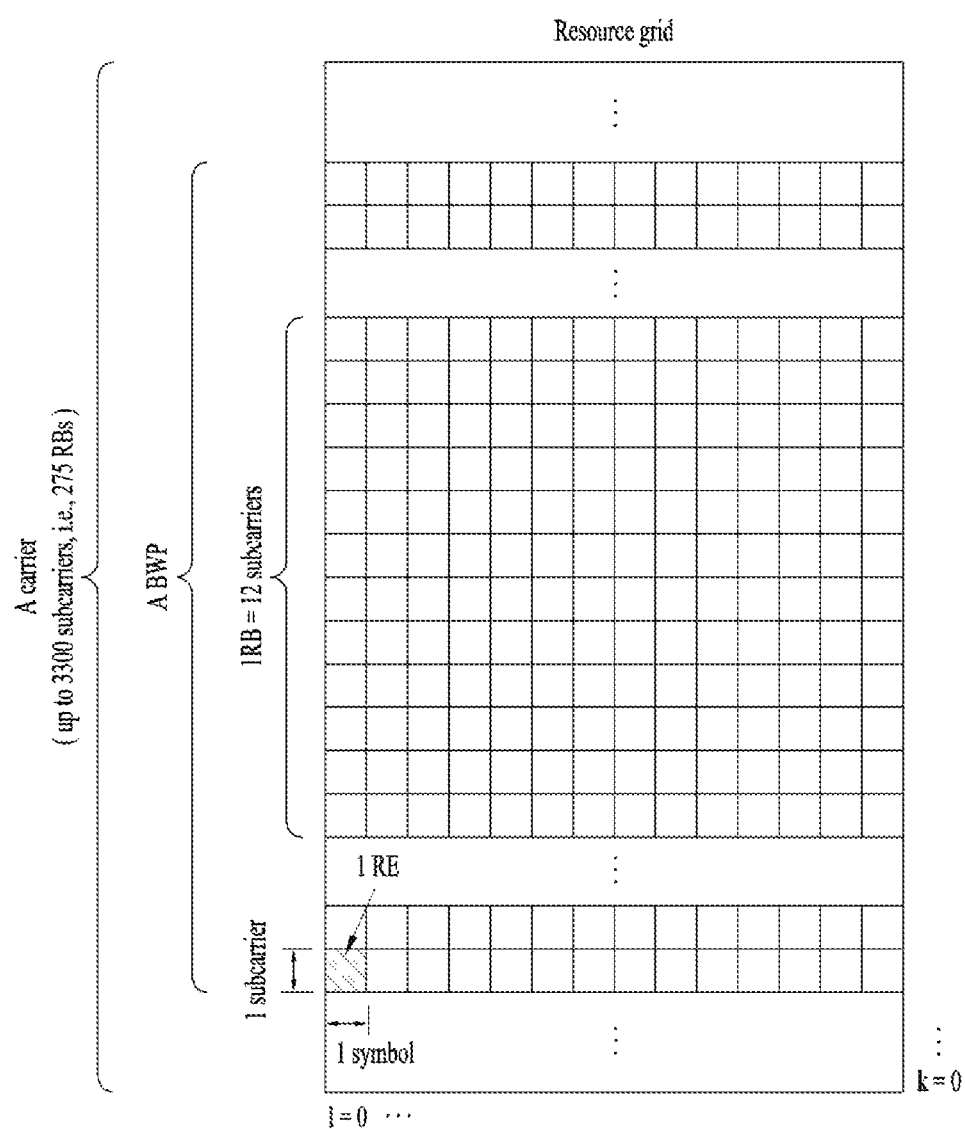
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
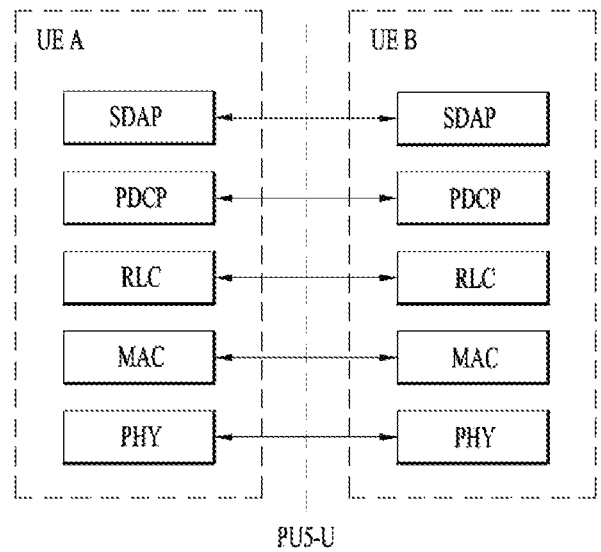
FIG. 6 illustrates a radio protocol architecture for SL communication.
Figure 6:
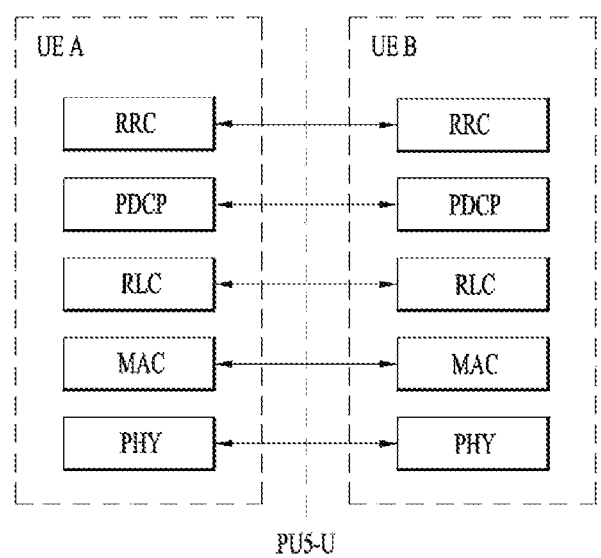

FIG. 6 illustrates a radio protocol architecture for SL communication. Specifically, FIG. 6-(a) shows a user plane protocol stack of NR, and FIG. 6-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be preconfigured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
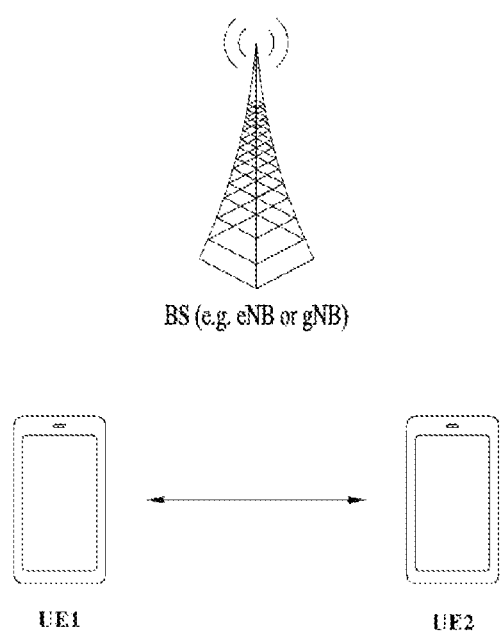
FIG. 7 illustrates UEs performing V2X or SL communication.

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
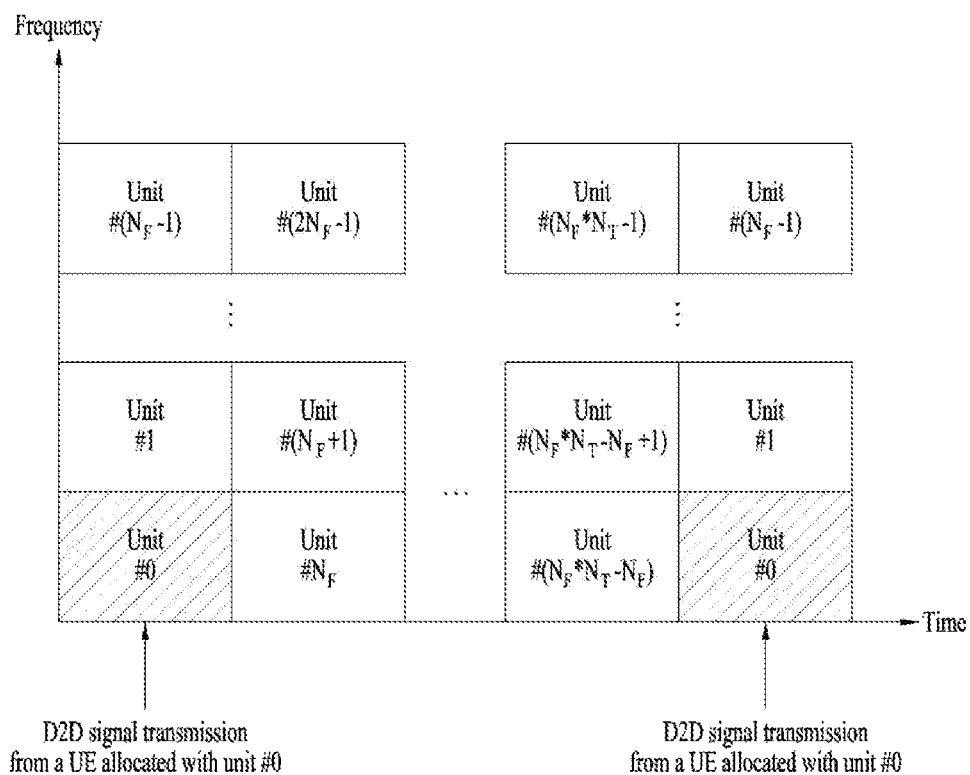
FIG. 8 illustrates resource units for V2X or SL communication.

FIG. 8 illustrates resource units for V2X or SL communication.

Referring to FIG. 8, the frequency resources of a resource pool may be divided into NF sets, and the time resources of the resource pool may be divided into NT sets. Accordingly, a total of NF*NT resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Vehicular Communications for ITS

An intelligent transport system (ITS) utilizing vehicle-to-everything (V2X) may mainly include an access layer, a network & transport layer, a facilities layer, an application layer, security and management entities, etc. Vehicle communication may be applied to various scenarios such as vehicle-to-vehicle communication (V2V), vehicle-to-network communication (V2N or N2V), vehicle-to-road side unit (RSU) communication (V2I or I2V), RSU-to-RSU communication (I2I), vehicle-to-pedestrian communication (V2P or P2V), and RSU-to-pedestrian communication (I2P or P2I). A vehicle, a BS, an RSU, a pedestrian, etc. as the subjects of vehicle communication are referred to as ITS stations.

Figure 9:
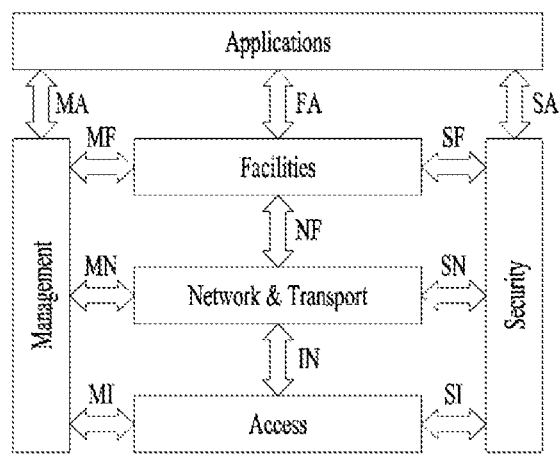
FIG. 9 is a diagram for explaining an ITS station reference architecture.

FIG. 9 is a diagram for explaining an ITS station reference architecture.

The ITS station reference architecture may include an access layer, a network & transport layer, a facilities layer, entities for security and management, and an application layer at the top. Basically, the ITS station reference architecture follows a layered OSI model.

Specifically, features of the ITS station reference architecture based on the OSI model are illustrated in FIG. 9. The access layer of the ITS station corresponds to OSI layer 1 (physical layer) and layer 2 (data link layer), the network & transport layer of the ITS station corresponds to OSI layer 3 (network layer) and layer 4 (transport layer), and the facilities layer of the ITS station corresponds to OSI layer 5 (session layer), layer 6 (presentation layer), and layer 7 (application layer).

The application layer, which is located at the highest layer of the ITS station, may actually implement and support a use-case and may be selectively used according to the use-case. The management entity serves to manage all layers in addition to managing communication and operations of the ITS station. The security entity provides security services for all layers. Each layer of the ITS station exchanges data transmitted or received through vehicle communication and additional information for various purposes through an interface. The abbreviations of various interfaces are described below.

MA: Interface between management entity and application layer

MF: Interface between management entity and facilities layer

MN: Interface between management entity and networking & transport layer

MI: Interface between management entity and access layer

FA: Interface between facilities layer and ITS-S applications

NF: Interface between networking & transport layer and facilities layer

IN: Interface between access layer and networking & transport layer

SA: Interface between security entity and ITS-S applications

SF: Interface between security entity and facilities layer

SN: Interface between security entity and networking & transport layer

SI: Interface between security entity and access layer

Figure 10:
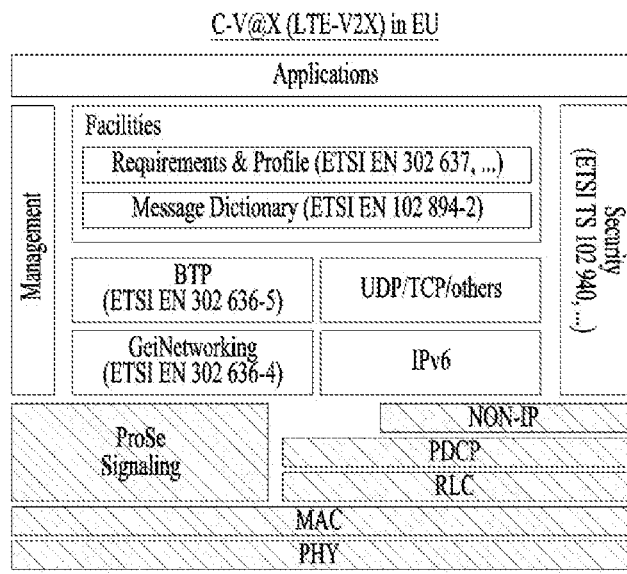
FIG. 10 illustrates an exemplary structure of an ITS station that may be designed and applied based on a reference architecture.
Figure 10:
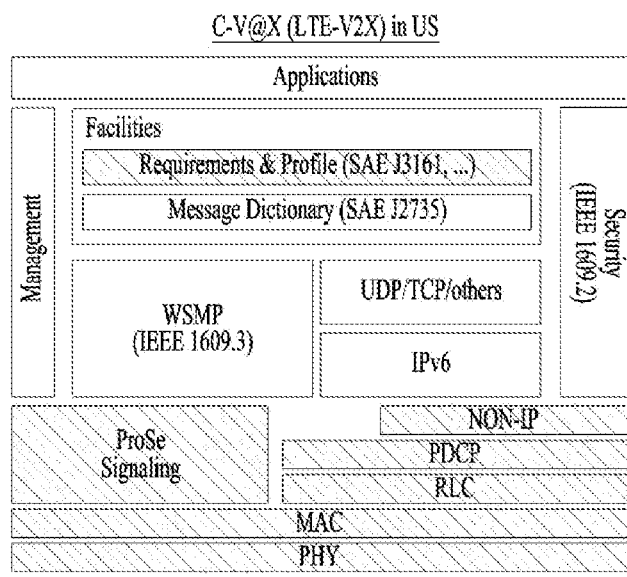

FIG. 10 illustrates an exemplary structure of an ITS station that may be designed and applied based on a reference architecture.

A main concept of the ITS station reference architecture is to allow each layer with a special function to process communication on a layer basis, between two end vehicles/users included in a communication network. That is, when a V2V message is generated, the data is passed through each layer downwards layer by layer in the vehicle and the ITS system (or other ITS-related UEs/systems), and a vehicle or ITS system (or other ITS-related UEs/systems) receiving the message passes the message upwards layer by layer.

The ITS system operating through vehicle communication and the network was organically designed in consideration of various access technologies, network protocols, communication interfaces, etc. to support various use-cases, and the roles and functions of each layer described below may be changed depending on a situation. The main functions of each layer will be briefly described.

The application later actually implements and supports various use-cases. For example, the application layer provides security, efficient traffic information, and other entertainment information.

The application layer controls an ITS station to which an application belongs in various manners or provides services by transferring a service message to an end vehicle/user/infrastructure through the access layer, the network & transport layer, and the facilities layer, which are lower layers of the application layer, by vehicle communication. In this case, the ITS application may support various use-cases. In general, these use-cases may be supported by grouping into other applications such as road-safety, traffic efficiency, local services, and infotainment. Application classification, use-cases, etc. may be updated when a new application scenario is defined. Layer management serves to manage and service information related to operation and security of the application layer, and the related information is transmitted and shared bidirectionally through an MA and an SA (or service access point (SAP), e.g. MA-SAP or SA-SAP). A request from the application layer to the facilities layer or a service message and related information from the facilities layer to the application layer may be delivered through an FA.

The facilities layer serves to support effective implementation of various use-cases defined in an application layer of a higher layer. For example, the facilities layer may perform application support, information support, and session/communication support.

The facilities layer basically supports the 3 higher layers of the OSI model, for example, a session layer, a presentation layer, and the application layer, and functions. Specifically, the facilities layer provides facilities such as application support, information support, and session/communication support, for the ITS. Here, the facilities mean components that provide functionality, information, and data.

The application support facilities support the operation of ITS applications (mainly generation of a message for the ITS, transmission and reception of the message to and from a lower layer, and management of the message). The application support facilities include a cooperative awareness (CA) basic service and a decentralized environmental notification (DEN) basic service. In the future, facilities entities for new services such as cooperative adaptive cruise control (CACC), platooning, a vulnerable roadside user (VRU), and a collective perception service (CPS), and related messages may be additionally defined.

The information support facilities provide common data information or a database to be used by various ITS applications and includes a local dynamic map (LDM).

The session/communication support facilities provide services for communications and session management and include an addressing mode and session support.

Facilities may be divided into common facilities and domain facilities.

The common facilities are facilities that provide common services or functions required for various ITS applications and ITS station operations, such as time management, position management, and service management.

The domain facilities are facilities that provide special services or functions required only for some (one or more) ITS applications, such as a DEN basic service for road hazard warning applications (RHW). The domain facilities are optional functions and are not used unless supported by the ITS station.

Layer management serves to manage and service information related to the operation and security of the facilities layer, and the related information is transmitted and shared bidirectionally through an MF and an SF (or MF-SAP and SF-SAP). The transfer of service messages and related information from the application layer to the facilities layer or from the facilities layer to the application layer is performed through an FA (or FA-SAP), and bidirectional service messages and related information between the facilities layer and the lower networking & transport layer are transmitted by an NF (or NF-SAP).

The network & transport layer servers to configure a network for vehicle communication between homogenous or heterogeneous networks through support of various transport protocols and network protocols. For example, the network & transport layer may provide Internet access, routing, and vehicle networking using Internet protocols such as TCP/UDP+IPv6 and form a vehicle network using a basic transport protocol (BTP) and GeoNetworking-based protocols. In this case, networking using geographic position information may also be supported. A vehicle network layer may be designed or configured depending on technology used for the access layer (access layer technology-independently) or regardless of the technology used for the access layer (access layer technology-independently or access layer technology agnostically).

Functionalities of the European ITS network & transport layer are as follows. Basically, functionalities of the ITS network & transport layer are similar to or identical to those of OSI layer 3 (network layer) and layer 4 (transport layer) and have the following characteristics.

Figure 11:
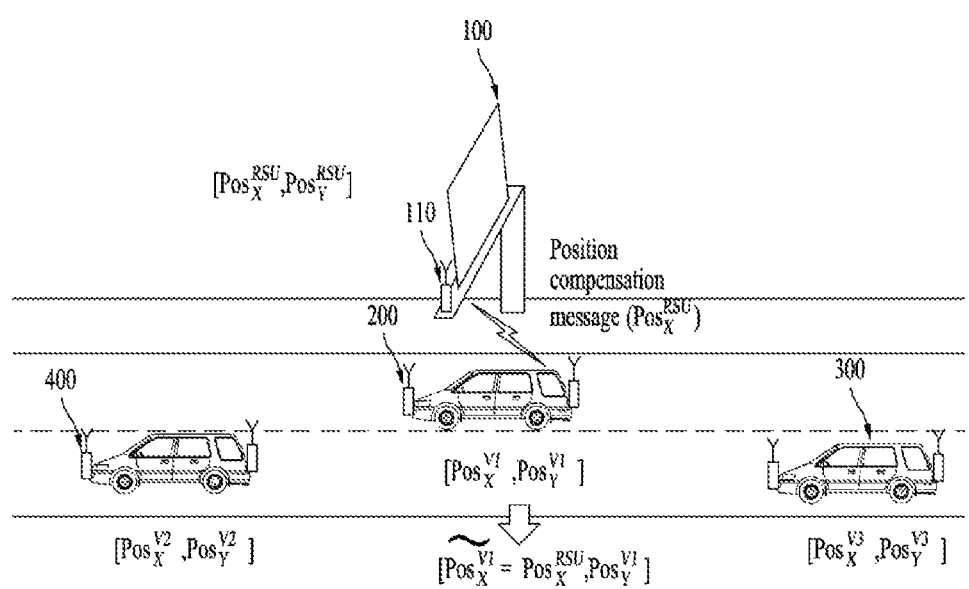
FIG. 11 is a system configuration diagram for explaining a method of performing position measurement based on communication between a vehicle with multiple antennas and a road side unit (RSU).

The transport layer is a connection layer that delivers service messages and related information received from higher layers (the session layer, the presentation layer, and the application layer) and lower layers (the network layer, the data link layer, and the physical layer). The transport layer serves to manage data transmitted by an application of the ITS station so that the data accurately arrives at an application process of the ITS station as a destination. Transport protocols that may be considered in European ITS include, for example, TCP and UDP used as legacy Internet protocols as illustrated in FIG. 11, and there are transport protocols only for the ITS, such as the BTS.

The network layer serves to determine a logical address and a packet forwarding method/path, and add information such as the logical address of a destination and the forwarding path/method to a header of the network layer in a packet received from the transport layer. As an example of the packet method, unicast, broadcast, and multicast between ITS stations may be considered. Various networking protocols for the ITS may be considered, such as GeoNetworking, IPv6 networking with mobility support, and IPv6 over GeoNetworking. In addition to simple packet transmission, the GeoNetworking protocol may apply various forwarding paths or transmission ranges, such as forwarding using position information about stations including vehicles or forwarding using the number of forwarding hops.

Layer management related to the network & transport layer serves to manage and provide information related to the operation and security of the network & transport layer, and the related information is transmitted and shared bidirectionally through an MN (or MN-SAP) and an SN (or SN-SAP). Transmission of bidirectional service messages and related information between the facilities layer and the networking & transport layer is performed by an NF (or NF-SAP), and service messages and related information between the networking & transport layer and the access layer are exchanged by an IN (or IN-SAP).

A North American ITS network & transport layer supports IPv6 and TCP/UDP to support existing IP data like Europe, and a wave short message protocol (WSMP) is defined as a protocol only for the ITS.

A packet structure of a wave short message (WSM) generated according to the WSMP includes a WSMP header and WSM data carrying a message. The WSMP header includes Version, PSID, WSMP header extension fields, WSM WAVE element ID, and Length.

Version is defined by a WsmpVersion field indicating an actual WSMP version of 4 bits and a reserved field of 4 bits. PSID is a provider service identifier, which is allocated according to an application in a higher layer and helps a receiver to determine an appropriate higher layer. Extension fields is a field for extending the WSMP header, and includes information such as a channel number, a data rate, and transmit power used. WSMP WAVE element ID specifies the type of a WSM to be transmitted. Length specifies the length of transmitted WSM data in octets through a WSMLength field of 12 bits, and the remaining 4 bits are reserved. LLC Header allows IP data and WSMP data to be transmitted separately and is distinguished by Ethertype of a SNAP. The structures of the LLC header and the SNAP header are defined in IEEE802.2. When IP data is transmitted, Ethertype is set to 0x86DD in the LLC header. When WSMP is transmitted, Ethertype is set to 0x88DC in the LLC header. The receiver identifies Ethertype. If Ethertype is 0x86DD, the receiver transmits upward the packet to an IP data path, and if Ethertype is 0x88DC, the receiver transmits upward the packet to a WSMP path.

The access layer serves to transmit a message or data received from a higher layer on a physical channel. As access layer technologies, ITS-G5 vehicle communication technology based on IEEE 802.11p, satellite/broadband wireless mobile communication technology, 2G/3G/4G (long-term evolution (LTE), etc.)/5G wireless cellular communication technology, cellular-V2X vehicle-dedicated communication technologies such as LTE-V2X and NR-V2X (new radio), broadband terrestrial digital broadcasting technology such as DVB-T/T2/ATSC3.0, and GPS technology may be applied.

A data link layer is a layer that converts a physical line between adjacent nodes (or between vehicles) with noise into a communication channel without transmission error, for use in the higher network layer. The data link layer performs a function of transmitting/delivering/forwarding L3 protocols, a framing function of dividing data to be transmitted into packets (or frames) as transmission units and grouping the packets, a flow control function of compensating for a speed difference between a transmitter and a receiver, and a function of (because there is a high probability that an error and noise occurs randomly in view of the nature of a physical transmission medium) detecting a transmission error and correcting the error or detecting a transmission error based on a timer and an ACK signal by a transmitter in a method such as automatic repeat request (ACK) and retransmitting a packet that has not been correctly received. In addition, to avoid confusion between packets or ACK signals, the data link layer performs a function of assigning a sequence number to the packets and the ACK signals, and a function of controlling establishment, maintenance, and disconnection of a data link between network entities, and data transmission between network entities. The main functions of logical link control (LLC), radio resource control (RRC), packet data convergence protocol (PDCP), radio link control (RLC), medium access control (MAC), and multi-channel operation (MCO) included in the data link layer of FIG. 11 will be described below.

An LLC sub-layer enables the use of different lower MAC sub-layer protocols, and thus enables communication regardless of network topology. An RRC sub-layer performs functions such as broadcasting of cell system information required for all UEs within a cell, management of delivery of paging messages, management (setup/maintenance/release) of RRC connection between a UE and an E-UTRAN, mobility management (handover), transmission of UE context between eNodeBs during handover, UE measurement reporting and control therefor, UE capability management, temporary assignment of a cell ID to a UE, security management including key management, and RRC message encryption. A PDCP sub-layer may performs functions such as IP packet header compression in a compression method such as robust header compression (ROHC), cyphering of a control message and user data, data integrity, and data loss prevention during handover. RLC sub-layer delivers a packet received from the higher PDCP layer in an allowed size of the MAC layer through packet segmentation/concatenation, increases data transmission reliability by transmission error and retransmission management, checks the order of received data, reorders data, and checks redundancy. A MAC sub-layer performs functions such as control of the occurrence of collision/contention between nodes for use of shared media among multiple nodes, matching a packet delivered from the higher layer to a physical layer frame format, assignment and identification of the address of the transmitter/receiver, detection of a carrier, collision detection, and detection of obstacles on the physical medium. An MCO sub-layer enables efficient provision of various services on a plurality of frequency channels. The main function of MCO sub-layer is to effectively distribute traffic load of a specific frequency channel to other channels to minimize collision/contention of communication information between vehicles in each frequency channel.

The physical layer is the lowest layer in the ITS layer architecture. The physical layer defines an interface between a node and a transmission medium and performs modulation, coding, and mapping of a transport channel to a physical channel, for bit transmission between data link layer entities and informs the MAC sub-layer of whether a wireless medium is busy or idle by carrier sensing or clear channel assessment (CCA).

Position Correction Based on V2I Signal Processing of Vehicle

In V2X systems, accurate position recognition is necessarily required for cooperative autonomous driving services. For the accurate position recognition, the following technologies: advanced GPS, dead reckoning (DR) based on sensors inside a vehicle may be employed. However, such a technology has a problem in that it is difficult to accurately recognize the position if there is no accurate reference point (or absolute reference).

Hereinafter, a positioning method for improving the performance of DR and assisting the performance of GPS based on communication between an RSU and a vehicle with conventional multiple antennas (or distributed antennas) will be described in consideration of the above problem. In this document, a vehicle may correspond to a V2X vehicle with a V2X module supporting sidelink communication or a first device.

FIG. 11 is a system configuration diagram for explaining a method of performing position measurement based on communication between a vehicle with multiple antennas and an RSU.

Referring to FIG. 11, vehicles may include distributed antennas distributed at specific intervals and receive a signal from the RSU based on the distributed antennas.

The RSU 110 may be installed in an installation 100 such as a signboard on the road, and the RSU may provide traffic light signals or traffic sign information to surrounding vehicles according to V2I standards. The RSU is a fixed device and may store information on the location at which the RSU is installed in advance. The vehicles 200, 300, and 400 may be equipped with a V2X system with two antennas for V2X communication. The vehicles 200, 300, and 400 may perform communication with neighboring vehicles (V2V) or communication with the RSU (V2I) based on the V2X system.

In this case, the surrounding vehicles may obtain their exact positions based on location information included in signals from the RSU. To this end, the surrounding vehicles may need to obtain information about the position of the RSU and information about times when the surrounding vehicles pass the corresponding position.

Hereinafter, a method of specifying or determining a time at which a surrounding vehicle is capable of accurately matching the position of an RSU and its position based on distributed antennas will be described in detail.

Figure 12:
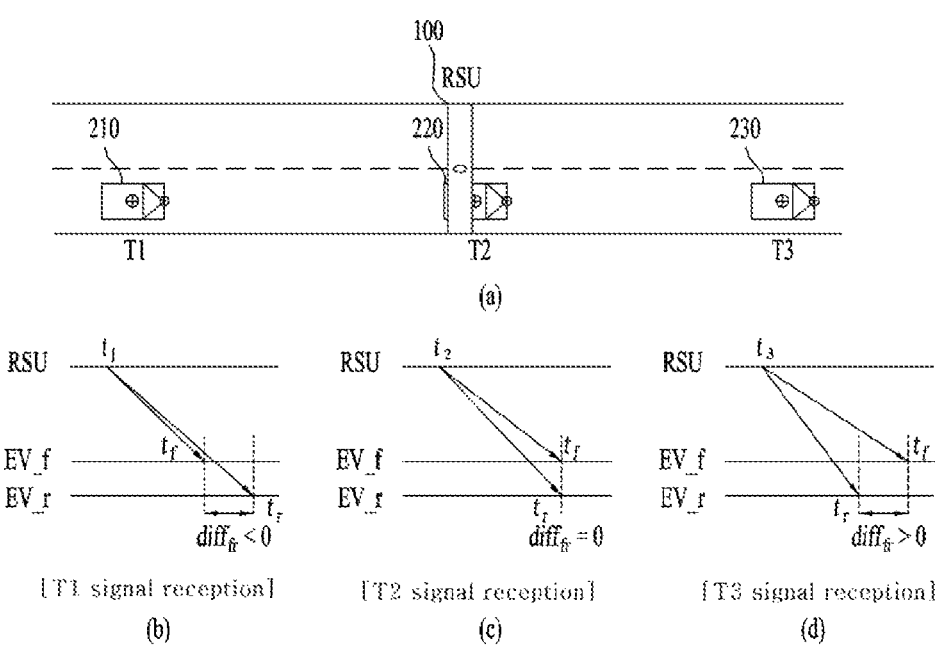
FIG. 12 is a diagram for explaining a method in which a vehicle performs position correction based on position information on an RSU using distributed antennas.

FIG. 12 is a diagram for explaining a method for a vehicle to perform position correction based on information on the position of an RSU using distributed antennas.

Referring to FIG. 12(a), there may be a difference in times at which a signal is received by two V2X antennas (or distributed antennas), depending on the positional relationship between the RSU and vehicle. For example, the difference between the reception times of a signal from the RSU measured by a first vehicle based on distributed antennas at a first time point T1 may be different from the difference between the reception times measured at a second time point T2 and/or the difference between the reception times measured at a third time point T3.

The vehicle is moving toward the RSU and is approaching the RSU at the first time point T1. In this case, due to the positional relationship between the RSU and the vehicle (simply referred to as the positional relationship), the front antenna of the vehicle may receive a signal transmitted from the RSU earlier. In other words, as shown in FIG. 12(b), a first reception time Tf at which the signal from the RSU is received by the front antenna may be earlier than a second reception time Tr at which the signal from the RSU is received by the rear antenna.

The vehicle is passing directly under the RSU (vertical below the ground) at the second time point T2. In this case, the distance between the front antenna of the vehicle and the transmission antenna of the RSU may be the same as the distance between the rear antenna of the vehicle and the transmission antenna of the RSU. Thus, as shown in FIG. 12(c), the front and rear antennas may receive the signal from the RSU at the same time (that is, the difference in times at which the signal from the RSU is received by the front and rear antennas is 0).

The vehicle is moving away from the RSU at the third time point T3 after passing through the point under the RSU. The transmission antenna of the RSU may be located closer to the rear antenna of the vehicle than the front antenna of the vehicle. Thus, as shown in FIG. 12(d), the reception time Tr at which the rear antenna receives the RSU signal may be earlier than the reception time (Tf) at which the front antenna receives the RSU signal.

As described above, the vehicle may specify and determine a time point (e.g., second time point) at which the position of the vehicle exactly corresponds to the position of the RSU (in longitude or latitude), based on the difference in times at which the signal (first signal) from the RSU is received by the distributed antennas. In other words, the vehicle may accurately measure the time when the vehicle passes under the RSU by receiving the first signal transmitted from the RSU at the fixed position based on distributed antenna systems installed at the front and rear of the vehicle. In this case, the absolute position of the RSU may be corrected to the position at the time when the vehicle accurately passes under the RSU (when the position of the vehicle exactly corresponds to the position of the RSU). Accordingly, the vehicle may correct its own position based on the accurate reference position.

However, the method of determining whether the vehicle passes through the position of the RSU based on the distributed antennas may not be applied to both axes (x-axis and y-axis). In other words, the vehicle may accurately perform the position correction or measurement in the driving direction of the road (x-axis or y-axis) for the position of the RSU included in the first signal according to the above-described method, but it may be difficult for the vehicle to accurately perform the position correction or measurement in the road width direction (y-axis or x-axis). In other words, the vehicle may accurately perform the position measurement or correction only for a longitude or latitude coordinate in the road driving direction, which is included in the first signal, based on the distributed antennas according to the above-described method.

Accordingly, a method in which the vehicle corrects or manages the position in two directions (i.e., longitude and latitude) based on the above-described method will be described below.

Figure 13:
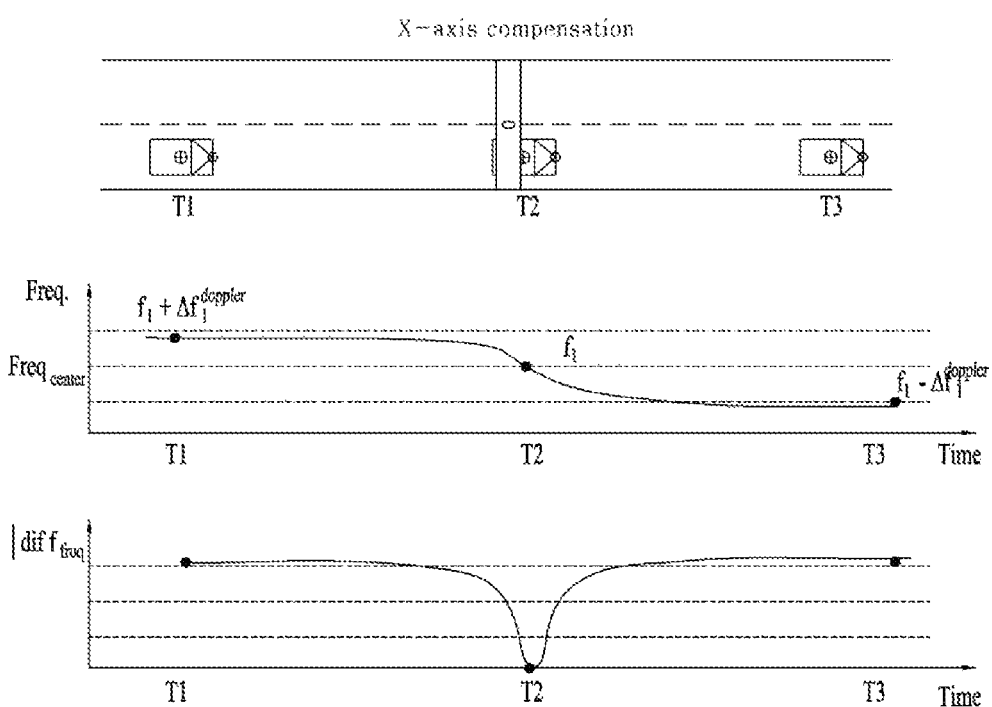
FIG. 13 is a diagram for explaining a method in which a vehicle determines a specific time based on Doppler characteristics.

FIG. 13 is a diagram for explaining a method in which a vehicle determines a specific time based on Doppler characteristics.

Specifically, FIG. 13 shows differences in frequency signals received by V2X antennas depending on the states of an RSU and the vehicle.

The vehicle may experience different signals depending on the position of the vehicle that drives under the RSU. Specifically, the vehicle is approaching the RSU at a first time T1. In this case, in the vehicle, the frequency band related to the signal from the RSU may increase due to the Doppler effect. As shown in FIG. 13, two antennas may receive a higher frequency because the speed-dependent Doppler frequency is added to the center frequency of the signal from the RSU. In addition, the value of Diff (difference between the received frequency and the center frequency) may increase depending on the speed.

The vehicle passes directly under the RSU at a second time T2, and thus the Doppler effect may disappear instantaneously. The Doppler frequency has a positive value before the corresponding point, and the Doppler frequency has a negative value after the corresponding point. That is, the value of Diff (difference between the center frequency of the signal from the RSU and a center frequency at which the signal from the RSU is received) may become zero at the second time T2 passing under the RSU.

The vehicle is moving away from the RSU at a third time T3. In this case, the frequency band at which the vehicle receives the signal from the RSU may decrease due to the Doppler frequency. As shown in FIG. 13, the two antennas may receive a lower frequency because the Doppler frequency is subtracted from the center frequency of the RSU. That is, the Diff (difference between the received frequency and the center frequency) may increase depending on the speed.

Accordingly, the vehicle may measure the position of the RSU by finding the inflection point of the center frequency. When this method is applied, there is an advantage that only one antenna is used. Further, the signal from the RSU, which is based on determining the specific time based on the Doppler effect, is not limited to radio waves used in wireless communication systems, and the signal may include signals of various wavelengths such as a ultrasonic wave, a sound wave, a ultraviolet ray, and an infrared ray.

Figure 14:
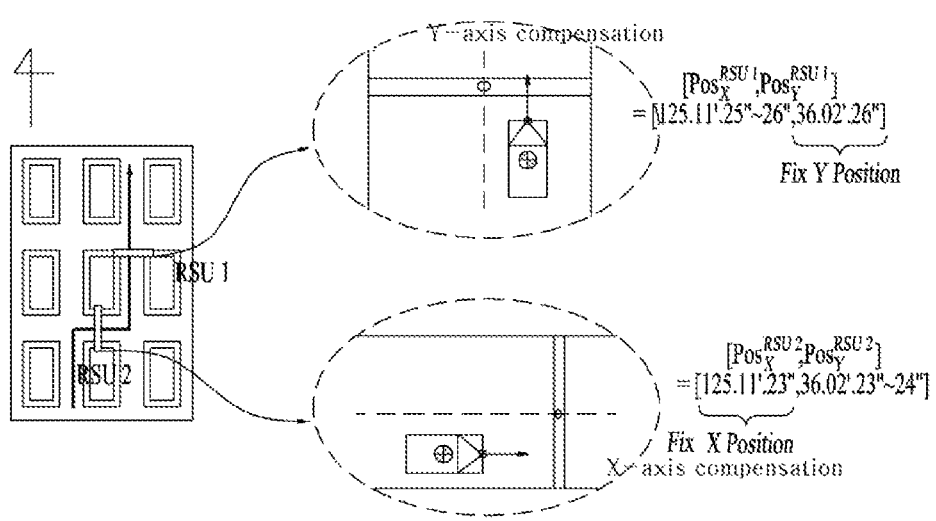
FIG. 14 is a diagram for explaining a method in which a vehicle corrects its own position based on position information received from a plurality of RSUs.

FIG. 14 is a diagram for explaining a method in which a vehicle corrects its own position based on position information received from a plurality of RSUs.

Referring to FIG. 14, the vehicle may drive on a road on which a second RSU (RSU2) is installed and a road on which a first RSU (RSU1) is installed.

For the road in the direction of the x-axis (the longitude axis or the first coordinate axis) (i.e., the road on which the second RSU is installed), the second RSU may provide surrounding vehicles with position information additionally including reference information designating (or marking) a reference position on the x-axis to surrounding vehicles (alternatively, the RSU may provide only a coordinate on the x-axis to the surrounding vehicles). For the road in the direction of the y-axis (or the latitude axis) (i.e., the road on which the first RSU is installed), the first RSU may provide surrounding vehicles with position information additionally including reference information designating a reference position on the y-axis (alternatively, the RSU may provide only a coordinate on the y-axis to the surrounding vehicles). For example, the RSU may transmit a first signal including position information including the latitude and longitude and reference information indicating whether a position correction target is the latitude axis or longitude axis to surrounding vehicles.

In this case, the vehicle driving under the RSU (i.e., the first RSU or the second RSU) may calculate a difference in times at which a signal from the RSU is received by distributed antennas and then estimate the exact time at which the vehicle passes under the RSU (i.e., the time when the location of the RSU coincides with the location of the vehicle). In addition, the vehicle may identify or recognize which axis of the position of the RSU is the reference axis, based on indication information included in the RSU signal. Then, the vehicle may correct its position based on a coordinate on the identified reference axis.

For example, the vehicle may correct the x-axis value of the vehicle based on the position information received from the second RSU (RSU2) and correct the y-axis value of the vehicle based on the position information received from the first RSU (RSU1). In this way, while passing through RSUs installed in various parts of the road, for example, each intersection or traffic sign, the vehicle may correct a coordinate corresponding to the reference position for each RSU.

For a signal including information on the position of an RSU according to the above-described method, the definition shown in Table 5 may be added.

TABLE 5

ASN.1 Representation

```
DF_V2I_message  ::= SEQEUNCE {
    ...              ...
    Position         DF_Position   -- from J2735
    refPositionX     INTEGER       -- variance, e.g +1m~−1m, unit 0.01 meter
    refPositionY     INTEGER       -- variance, e.g +1m~−1m, unit 0.01 meter
    .....            .....
}.
```

Specifically, a V2I message transmitted by each RSU may include a Position value corresponding to the accurate position of the corresponding RSU. The Position value may indicate the position based on the value of DF_Position defined in the SAE J2735 document. In addition, the V2I message may further include information on refPositionX and/or refPositionY indicating a position to be corrected based on the direction of a road under the RSU (that is, a road on which the RSU is installed or a road corresponding to a structure on which the RSU is installed).

Alternatively, the Position value may correspond to the absolute position of the RSU or the position of a transmission antenna on which an RSU signal is transmitted. For example, when the position of the RSU is different from the position of the transmission antenna, the Position value may include position information related to the position of the transmission antenna.

Alternatively, refPositionX and refPositionY may be expressed as variances for the position based on the width of each lane in the driving direction of the road. Here, the variance may be in units of 0.01 meter. In addition, among refPositionX and refPositionY, refPosition with a variance of 0 may be a reference coordinate axis. That is, the vehicle may correct its position corresponding to the coordinate axis in which the variance is 0.

For example, if the variance for refPositionX is 100 and the variance for refPositionY is 0, the vehicle may correct its position on the corresponding road based on the y-coordinate axis and recognize that the width of the road varies from +1 meter to −1 meter based on the x-coordinate axis.

However, even if the RSU transmits a signal periodically, the vehicle may not receive the signal when the vehicle passes directly under the RSU. In this case, the vehicle may fail to detect or calculate the time point when the signal reception time difference between the front and rear antennas is 0.

Accordingly, a method in which the vehicle calculates a difference in times at which a signal is received from the RSU (Diff value) and then estimates a reference time point at which the difference in times becomes zero will be described.

Figure 15:
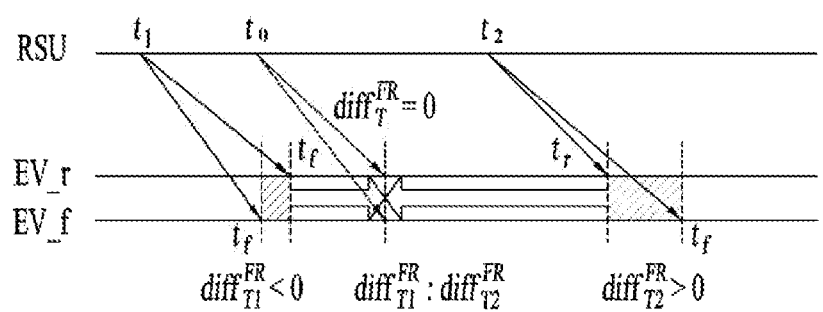
FIG. 15 is a diagram for explaining a method in which a vehicle estimates a reference time point based on a difference in reception times calculated by the vehicle using distributed antennas.

FIG. 15 is a diagram for explaining a method in which a vehicle estimates a reference time point based on a difference in reception times calculated by the vehicle using distributed antennas.

Referring to FIG. 15, the vehicle may calculate a difference in times at which a signal is continuously received from the RSU based on distributed antenna systems installed in the front and rear thereof. The vehicle may detect a change in the sign of the calculated difference and recognize that the vehicle is passing directly under the RSU based on the change of the sign. In this case, an algorithm for estimating the time at which the vehicle passes through the RSU may be driven based on a first difference before the sign changes and a second difference after the sign changes.

For example, if the vehicle passes under the RSU between two V2I signals which are periodically transmitted by the RSU (t1 and t2). The first difference calculated based on an RSU signal received at the first time t1 may have a negative value (when tf is smaller than tr), and the second difference calculated based on an RSU signal received at the second time t2 may have a positive value (when tf is greater than tr). In this case, the vehicle may calculate or measure a ratio between the two differences based on the absolute value of each of the two differences. Based on the calculated ratio, the vehicle may estimate or calculate a reference time point or a specific time at which the vehicle passes under the RSU.

The vehicle may further correct the estimated vehicle position in consideration of the relationship between the positions of the distributed antennas and the reference position of the vehicle.

Figure 16:
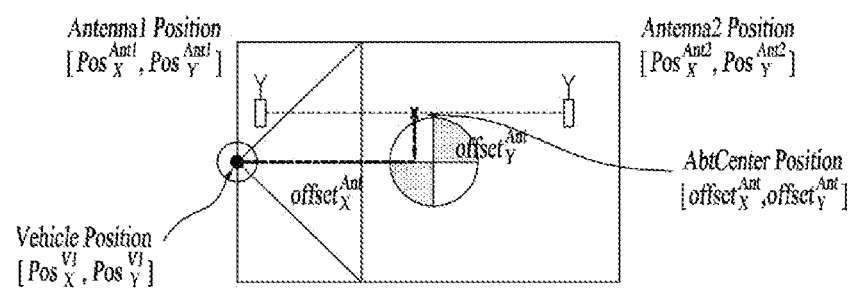
FIG. 16 is a diagram for explaining a method in which a vehicle corrects a position calculated based on a signal from an RSU such that the calculated position corresponds to a reference position of the vehicle.

FIG. 16 is a diagram for explaining a method in which a vehicle corrects a position calculated based on a signal from an RSU such that the calculated position corresponds to a reference position of the vehicle.

Referring to FIG. 16, position information, which is calculated based on a difference in times at which the RSU signal is received by distributed antennas and the absolute position of the RSU, may not correspond to a specific position of the vehicle, which serves as a reference for estimating the position of the vehicle.

In other words, the reference time at which the vehicle passes under the RSU is a time at which the center point of the distributed antennas passes under the RSU, and the position corrected based on the reference time may not correspond to the specific position of the vehicle (the position of the front center of the vehicle or the position of the front antenna). In general, the position of the vehicle may be measured based on the front center as shown in FIG. 15. That is, for position correction based on GPS or DR, the vehicle may need to calculate an offset from the reference position based on installation specifications of distributed antennas, which are located differently for each vehicle.

For the vehicle, since the position of the RSU, which is the reference at the reference time, corresponds to the center point of the distributed antennas, an additional offset needs to be applied to the position of the RSU to accurately correct the vehicle position at the specific point. The offset corresponds to a difference between the center point and the reference position as shown in FIG. 15.

As described above, a system for communicating between an RSU and a vehicle with two distributed antennas may more accurately correct the position of a positioning system such as GPS and/or DR. That is, without construction of a separate infrastructure system, accurate position estimation may be achieved by an RSU message that additionally includes the information defined in Table 5 and a simple time difference between signals received by the vehicle, thereby enabling secure cooperative autonomous driving services.

Figure 17:
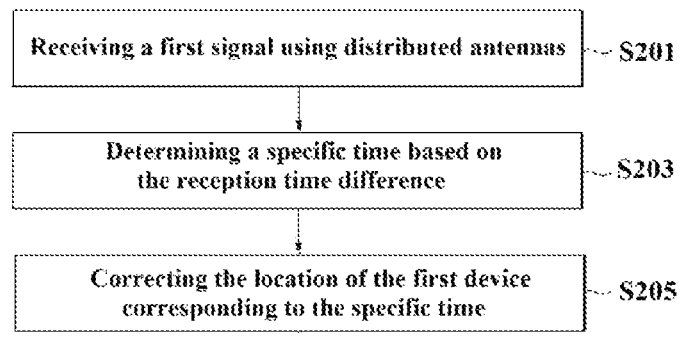
FIG. 17 is a diagram for explaining a method in which a first device corrects a position at a specific time based on a first signal received by the first device.

FIG. 17 is a diagram for explaining a method in which a first device corrects a position at a specific time based on a first signal received by the first device.

Referring to FIG. 17, the first device may receive a first signal from a second device based on first and second antennas distributed at a predetermined distance (S201). The first device may obtain information on the absolute position of the second device from the first signal, and the information on the absolute position of the second device may include a coordinate on a first coordinate axis and a coordinate on a second coordinate axis. Here, the coordinate on the first coordinate axis and the coordinate on the second coordinate axis may be latitude and longitude.

Hereinafter, for convenience of description, the position of the first device on the first coordinate axis is defined as the first coordinate, and the position of the first device on the second coordinate axis is defined as the second coordinate. In addition, the position of the second device on the first coordinate axis is defined as a third coordinate, and the position of the second device on the second coordinate axis is defined as a fourth coordinate. Here, the first coordinate axis may correspond to the longitude axis, and the second coordinate axis may correspond to the latitude axis.

The first device may be a vehicle driving on a road or a device mounted in the vehicle, and the vehicle or device may include a V2X communication module for V2X communication. The second device may be an RSU installed in or attached to the road or a structure installed around the road, which may have a fixed absolute position. Further, the second device may repeatedly transmit the first signal with a predetermined periodicity.

Next, the first device may determine the specific time based on a difference in times at which the first signal is received by the first and second antennas (S203). Here, the specific time may be a time point when it is determined by the first device that the absolute position included in the first signal corresponds to the position of the first device.

Specifically, it is necessary for the first device to determine whether to correct its own position at any point in time based on the position of the second device. The time point when the first device corrects the position of the first device may be a time point when the first device passes directly under the second device as described above. The first device may determine the specific time when the first device passes directly under the second device, based on the first and second antennas. Specifically, the first device may determine the specific time by calculating the difference in times at which the first signal transmitted by the second device is received by the first and second antennas.

For example, when the reception time difference is 0, the first device may know that the first device is passing directly under the second device (that is, it may be seen that the intermediate point between the first and second antennas is vertically under the second device). In addition, the first device may determine a time at which the difference in the reception times of the first signal becomes 0 as the specific time. In this case, the first device may correct its position to the position of the second device by considering that its position at the specific time coincides with the position of the second device. Here, the position of the first device at the specific time means a position at which the first device is located at the specific time.

Alternatively, it may be difficult for the first device to receive the first signal when the first device passes directly under the second device. In this case, the first device may detect whether the first device passes directly under the second device based on a change in the sign of the reception time difference. The first device may determine the specific time (e.g., time point when the position of the first device corresponds to or coincides with the position of the second device) based on a ratio between a first reception time difference and a second reception time difference where the sign of the reception time difference changes.

Specifically, the first device may receive the first signal at each of first and second times. The first device may calculate the first reception time difference based on the first signal received at the first time and calculate the second reception time difference based on the first signal received at the second time. When the sign of the first reception time difference is different from the sign of the second reception time difference, the first device may calculate the ratio between the first reception time difference and the second reception time difference. In other words, upon detecting a sign change in the first reception time difference and the second reception time difference, the first device may calculate or estimate the specific time point at which the reception time difference is 0, based on the ratio between the first reception time difference and the second reception time difference.

Specifically, the first device may specify the specific time based on the following equation: first reception time difference/second reception time difference=(first time−specific time)/(second time−specific time).

Alternatively, the first device may determine the specific time in consideration of the Doppler effect occurring while the first signal is received. When the first device approaches the second device, the first signal at a reception center frequency higher or lower than the transmission center frequency of the first signal by the Doppler effect according to the speed at which the first device approaches or moves away from the second device can be received. When the first device approaches the second device, the first device may receive the first signal at a reception center frequency higher or lower than the transmission center frequency of the first signal due to the Doppler effect, depending on the speed at which the first device approaches or moves away from the second device. When the first device passes directly under the second device, the Doppler effect may be minimized. Thus, the first device may receive the first signal at a center frequency corresponding to the center frequency of the first signal. In consideration of this, the first device may determine as the specific time the reception time of the first signal when the center frequency at which the first signal is received coincides with the center frequency (or transmission center frequency) of the first signal (within a predetermined range). Alternatively, the first device may information on a first center frequency of the first signal in advance and continuously monitor the difference between the first center frequency and a second center frequency related to the received first signal. If the difference is 0 (or if the difference changes from a positive value to a negative value and vice versa), the specific time may be determined as the reception time of the first signal.

The first device may additionally receive a second signal from the second device and determine a specific time based on the second signal. In this case, the first device may determine the specific time point at which the position of the first device corresponds to the position of the second device in consideration of the Doppler effect on the second signal. That is, the first device may obtain information on a first center frequency of the second signal in advance. The first device may determine the specific time at which the first device passes directly under the second device by considering a difference between the first center frequency and a second center frequency related to the received second signal. In this case, the second signal may be an ultrasonic wave, a sound wave, an infrared ray, or an ultraviolet ray transmitted in a different frequency band from a radio wave used in wireless communication systems.

Next, the first device may correct the position of the first device corresponding to the determined specific time based on information on the position of the second device (S205). That is, the first device may obtain at least one of a first coordinate and a second coordinate of the first device corresponding to the specific time based on at least one of a third coordinate and a fourth coordinate of the second device.

However, as described above, when the first device passes directly under the second device, the first device may have a position corresponding to the position of the second device on a coordinate axis parallel to the driving direction, but it may be difficult to accurately correspond to the position of the second device on a coordinate axis parallel to the road width direction.

For example, the second device may be installed on a third lane of the road. A first coordinate axis may be parallel to the road driving direction, and a second coordinate axis may be parallel to the road width direction (or perpendicular to the road driving direction). In this case, even if the first device drives on any lane of the road, the first coordinate (or the position of the first device on the first coordinate axis) may coincide with the third coordinate (or the position of the second device on the first coordinate axis) at the specific time point (i.e., the time point when the reception time difference is 0). On the other hand, depending on the lane the first device drives, the second coordinate (or the position of the first device on the second coordinate axis) may be different from the fourth coordinate (or the position of the second device on the second coordinate axis) at the specific time point. That is, it is difficult for the first device to accurately match the second coordinate with the fourth coordinate even if it is detected that the first device passes directly under the second device.

Accordingly, the second device may further include and transmit information indicating one of the first and second coordinate axes capable of being precisely matched in the road direction in the first signal. The one coordinate axis may be a coordinate axis parallel to the road direction among the first and second coordinate axes. In other words, the second device may further include and transmit information for specifying one coordinate axis capable of being matched with the position of the second device with high accuracy among the first and second coordinate axes in the first signal.

Specifically, the first device may specify one coordinate axis to be corrected among the first and second coordinate axes based on the first signal. The one coordinate axis may be specified by an indicator directly indicating one of the first and second coordinate axes. Alternatively, the first signal may further include variance information on a first variance related to the third coordinate on the first coordinate axis (or an error that may occur when the first coordinate is corrected based on the third coordinate) and a second variance related to the fourth coordinate on the second coordinate axis (or an error that may occur when the first coordinate is corrected based on the third coordinate). The first device may determine or specify the one coordinate axis based on the variance information. For example, when the first variance is 0 and when the second variance is greater than 0, the first device may determine the first coordinate axis as the one coordinate axis. Alternatively, when the absolute value of the first variance is within a predetermined threshold range and when the absolute value of the second variance is out of the predetermined threshold range, the first device may determine the first coordinate axis as the one coordinate axis.

In this case, the first device may determine the one coordinate axis indicated by the first signal from among the first and second coordinate axes and then correct only a coordinate on the one coordinate axis. For example, when the one coordinate axis is the second coordinate axis, the first device may correct only the second coordinate based on the fourth coordinate included in the first signal. Alternatively, when the one coordinate axis is the second coordinate axis, the first device may correct the second coordinate to the fourth coordinate.

Alternatively, the first device may correct a value obtained by adding a predetermined offset to the coordinate of the second device on the one coordinate axis to the coordinate of the first device on the one coordinate axis. The predetermined offset may be configured for each of the first and second coordinate axes. For example, the predetermined offset may be preconfigured based on a difference between an intermediate point between the first and second antennas and a reference point for measuring the position of the first device (e.g., front center point of the vehicle). For the first coordinate axis, the distance between the intermediate point and the reference point on the first coordinate axis may be preconfigured as the predetermined offset. For the second coordinate axis, the distance between the intermediate point and the reference point on the second coordinate axis may be preconfigured as the predetermined offset.

Figure 18:
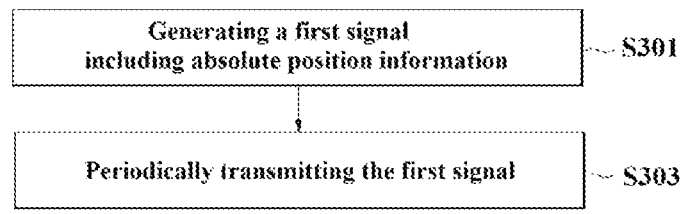
FIG. 18 is a diagram for explaining a method in which a second device transmits a first signal required for position correction to surrounding devices.

FIG. 18 is a diagram for explaining a method in which a second device transmits a first signal required for position correction to surrounding devices.

Referring to FIG. 18, the second device may generate the first signal including information on the absolute position of the second device (S301). The absolute position may include a third coordinate on the first coordinate axis and a fourth coordinate on the second coordinate axis as described with reference to FIG. 17. The second device may be a device installed in or attached to a road or a structure installed around the road, which may have a fixed absolute position.

Alternatively, the second device may generate the first signal including information for specifying one of the first and second coordinate axes based on the driving direction of the road. For example, as described with reference to FIG. 17, the second device may include information for specifying a coordinate axis parallel to the road driving direction (or a coordinate axis within a predetermined angle range from the road driving direction) among the first and second coordinate axes in the first signal.

Specifically, the second device may include information for directly designating or indicating the one coordinate axis in the first signal. Alternatively, the second device may generate the first signal including variance information on a first variance related to the third coordinate on the first coordinate axis (or an error that may occur when the first coordinate is corrected based on the third coordinate) and a second variance related to the fourth coordinate on the second coordinate axis (or an error that may occur when the first coordinate is corrected based on the third coordinate). In this case, surrounding vehicles may determine a coordinate axis in which the variance is 0 or within a predetermined threshold range as the one coordinate axis. Alternatively, the surrounding vehicles may determine a coordinate axis corresponding to a smaller variance among the first and second variances as the one coordinate axis.

Next, the second device may transmit the first signal including the information on the absolute position and/or the information for specifying the one coordinate axis (S303). The second device may periodically transmit the first signal.

The second device may measure the average moving speed of the surrounding vehicles and then change or adjust the transmission period of the first signal depending on the measured average moving speed. For example, if the average moving speed is greater than or equal to a predetermined threshold, the second device may set the transmission period of the first signal shorter than a predetermined transmission period. Alternatively, if the average moving speed is less than the predetermined threshold, the second device may set the transmission period of the first signal longer than the predetermined transmission period.

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 19:
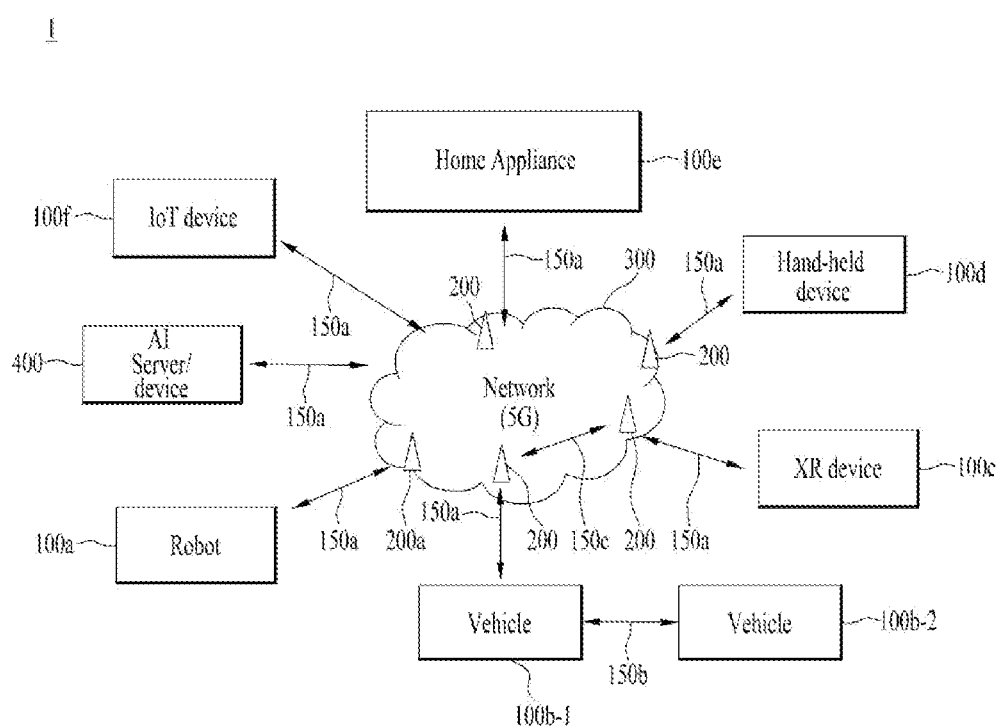
FIG. 19 illustrates a communication system applied to the present disclosure.

FIG. 19 illustrates a communication system applied to the present disclosure.

Referring to FIG. 19, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 20:
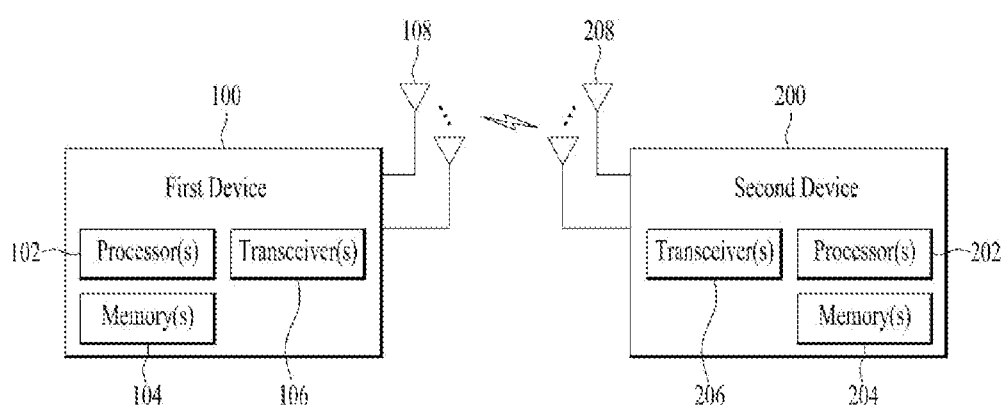
FIG. 20 illustrates wireless devices applicable to the present disclosure.

FIG. 20 illustrates a wireless device applicable to the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s)

104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, the first wireless device 100 may be a first device or a V2X communication module included in a vehicle. The first wireless device 100 may include the processor(s) 102 connected to an RF transceiver and the memory(s) 104. The memory(s) 104 may include at least one program for performing operations related to the embodiments described with reference to FIGS. 11 to 17.

The processor(s) 102 may be configured to: control a first antenna and a second antenna to receive a first signal including information on a position of a second device on a first coordinate axis and a second coordinate axis; determine a specific time at which a position of the first device corresponds to the position of the second device, based on a difference in reception times at which the first signal is received by the first antenna and the second antenna; and correct the position of the first device at the specific time on one coordinate axis specified by the first signal among the first coordinate axis and the second coordinate axis. The processor(s) 102 may perform operations for correcting the position of the first device based on the first signal, which are described with reference to FIGS. 11 to 18, based on the program included in the memory(s) 104.

Alternatively, there may be provided a chipset configured to correct a position of a first device having a first antenna and a second antenna distributed at a predetermined distance in a wireless communication system supporting sidelink. The chipset may include the processor(s) 102 and the memory(s) 104. In this case, the chipset may include: at least one processor; and at least one memory operably connected to the at least one processor and configured to, when executed, cause the at least one processor to perform operations.

The at least one processor included in the chipset may be configured to: receive a first signal on the first antenna and the second antenna, wherein the first signal may include information on a position of a second device on a first coordinate axis and a second coordinate axis; determine a specific time at which the position of the first device corresponds to the position of the second device, based on a difference in reception times at which the first signal is received by the first antenna and the second antenna; and correct the position of the first device at the specific time on one coordinate axis specified by the first signal among the first coordinate axis and the second coordinate axis.

Alternatively, there may be provided a computer-readable storage medium including at least one computer program configured to correct a position of a first device having a first antenna and a second antenna distributed at a predetermined distance in a wireless communication system supporting sidelink. The computer-readable storage medium may include: the at least one computer program configured to cause at least one processor to perform operations for correcting the position of the first device; and the computer-readable storage medium having stored thereon the at least one computer program. The operations may include: receiving a first signal on the first antenna and the second antenna, wherein the first signal may include information on a position of a second device on a first coordinate axis and a second coordinate axis; determining a specific time at which the position of the first device corresponds to the position of the second device, based on a difference in reception times at which the first signal is received by the first antenna and the second antenna; and correcting the position of the first device at the specific time on one coordinate axis specified by the first signal among the first coordinate axis and the second coordinate axis.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip Specifically, the second wireless device 200 may be a BS or a second device (RSU) installed on a road. The second wireless device 200 may include the processor(s) 202 and the memory(s) 204 connected to an RF transceiver. The memory(s) 104 may include at least one program for performing operations related to the embodiments described with reference to FIGS. 11 to 18.

The processor(s) 202 may be configured to: generate a first signal including information on a position of the second device on a first coordinate axis and a second coordinate axis; and control the RF transceiver to transmit the first signal periodically. The first signal may further include information specifying one coordinate axis that needs to be corrected by surrounding devices among the first coordinate axis and the second coordinate axis.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 21:
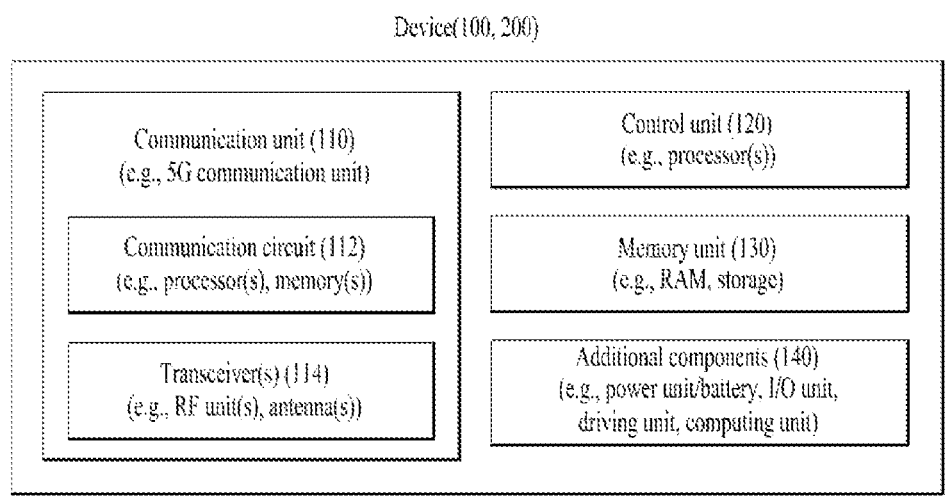
FIG. 21 illustrates another example of a wireless device to which the present disclosure is applied.

FIG. 21 illustrates another example of a wireless device applied to the present disclosure. The wireless device may be implemented in various forms according to a use-case/service (refer to FIG. 19)

Referring to FIG. 21, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place according to a use—example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 22:
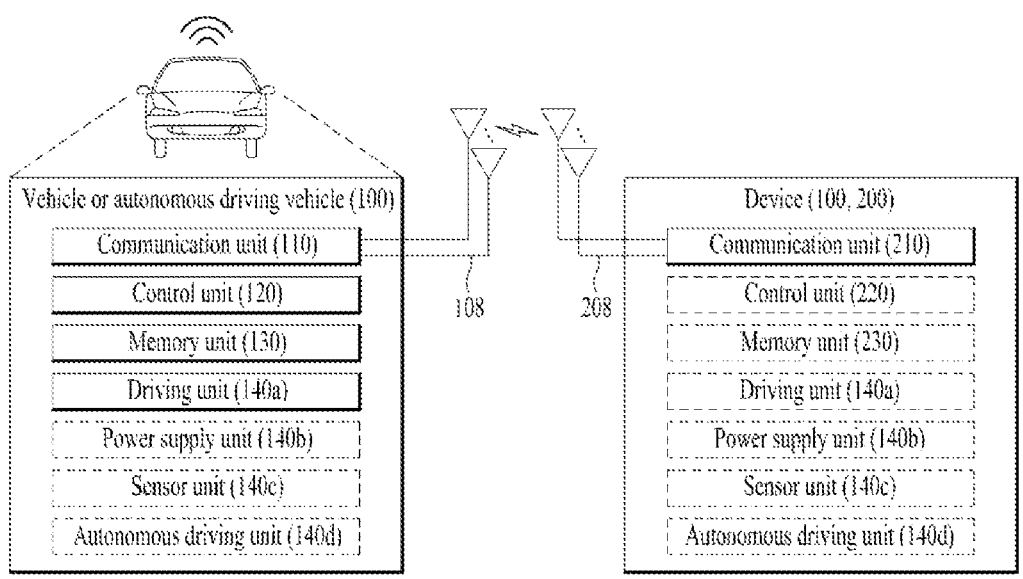
FIG. 22 illustrates a vehicle or an autonomous driving vehicle applied to the present disclosure.

Examples of Vehicles or Autonomous Vehicles to which the Present Disclosure is Applied FIG. 22 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 22, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the acquired data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

The invention claimed is:

1. A method of correcting, by a first device, a position based on a first antenna and a second antenna distributed at a predetermined distance in a wireless communication system supporting sidelink, the method comprising:
    receiving a first signal on the first antenna and the second antenna, wherein the first signal comprises information on a position of a second device on a first coordinate axis and a second coordinate axis; and
    correcting a position of the first device based on the first signal,
    wherein the first device determines a specific time at which the position of the first device corresponds to the position of the second device, based on a difference in reception times at which the first signal is received by the first antenna and the second antenna, and
    wherein the first device corrects the position of the first device at the specific time on one coordinate axis specified by the first signal among the first coordinate axis and the second coordinate axis.

2. The method of claim 1, wherein the first signal further comprises information on a first variance related to the first coordinate axis and a second variance related to the second coordinate axis.

3. The method of claim 2, wherein a coordinate axis related to a variance within a predetermined threshold range among the first variance and the second variance is specified as the one coordinate axis.

4. The method of claim 2, wherein the first device is configured to determine as the one coordinate axis a coordinate axis related to a variance with a value of 0 among the first variance and the second variance.

5. The method of claim 1, wherein the first device is configured to determine as the specific time a time of receiving the first signal at which the difference in reception times is calculated as 0.

6. The method of claim 1, wherein the first device is configured to:
    periodically calculate the difference in reception times based on the received first signal; and
    determine the specific time based on a change in a sign of the calculated difference in reception times.

7. The method of claim 6, wherein the first device is configured to determine the specific time based on a ratio between a first difference in reception times before the sign changes and a second difference in reception times after the sign changes.

8. The method of claim 1, wherein the first device is configured to correct a coordinate of the first device on the one coordinate axis to a value obtained by adding a predetermined offset to a coordinate of the second device on the one coordinate axis.

9. The method of claim 1, wherein the predetermined offset is preconfigured based on a positional relationship between an intermediate point between the first antenna and the second antenna in the first device and a reference point serving as a reference for the position of the first device.

10. The method of claim 1, wherein the first coordinate axis and the second coordinate axis are a latitude axis and a longitude axis, respectively.

11. A method of transmitting, by a second device, a first signal in a wireless communication system supporting sidelink, the method comprising:
generating the first signal comprising information on a position of the second device on a first coordinate axis and a second coordinate axis; and
transmitting the first signal periodically,
wherein the first signal further comprises information specifying one coordinate axis that needs to be corrected by surrounding devices among the first coordinate axis and the second coordinate axis.

12. A first device configured to correct a position in a wireless communication system supporting sidelink, the first device comprising:
a first antenna;
a second antenna, wherein the first antenna and the second antenna are distributed at a predetermined distance; and
a processor connected to the first antenna and the second antenna,
wherein the processor is configured to:
control the first antenna and the second antenna to receive a first signal comprising information on a position of a second device on a first coordinate axis and a second coordinate axis;
determine a specific time at which a position of the first device corresponds to the position of the second device, based on a difference in reception times at which the first signal is received by the first antenna and the second antenna; and
correct the position of the first device at the specific time on one coordinate axis specified by the first signal among the first coordinate axis and the second coordinate axis.

13. A second device configured to transmit a first signal in a wireless communication system supporting sidelink, the second device comprising:
a radio frequency (RF) transceiver; and
a processor connected to the RF transceiver,
wherein the processor is configured to:
generate the first signal comprising information on a position of the second device on a first coordinate axis and a second coordinate axis; and
control the RF transceiver to transmit the first signal periodically, and
wherein the first signal further comprises information specifying one coordinate axis that needs to be corrected by surrounding devices among the first coordinate axis and the second coordinate axis.

14. A non-transitory computer-readable storage medium comprising at least one computer program in a wireless communication system supporting sidelink, the non-transitory computer-readable storage medium comprising:
the at least one computer program configured to cause at least one processor to perform operations for correcting the position of the first device having a first antenna and a second antenna distributed at a predetermined distance; and
the non-transitory computer-readable storage medium having stored thereon the at least one computer program,
wherein the operations comprise:
receiving a first signal on the first antenna and the second antenna, wherein the first signal comprises information on a position of a second device on a first coordinate axis and a second coordinate axis;
determining a specific time at which the position of the first device corresponds to the position of the second device, based on a difference in reception times at which the first signal is received by the first antenna and the second antenna; and
correcting the position of the first device at the specific time on one coordinate axis specified by the first signal among the first coordinate axis and the second coordinate axis.

* * * * *